United States Patent Office 3,403,086
Patented Sept. 24, 1968

3,403,086
PHOTOCHEMICAL PROCESS FOR PRODUCING FLUOROIMINO COMPOUNDS
Douglas H. Dybvig, St. Paul, Minn., assignor to Minnesota Mining and Manufacturing Company, St. Paul, Minn., a corporation of Delaware
No Drawing. Filed Mar. 30, 1966, Ser. No. 539,612
5 Claims. (Cl. 204—158)

ABSTRACT OF THE DISCLOSURE

Fluoroimino compounds having the formula

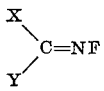

are produced by subjecting a bis-difluoroamino compound having the formula

to the action of ultra-violet light, $x$ and $y$ being chlorine or fluorine. Nitrous oxide may be used as a free radical scavenger.

---

This invention relates to processes for the production of fluoroimino compounds.

It has been proposed previously to produce fluoroimino compounds by direct fluorination of various nitrogen compounds containing organic materials. These processes are extremely energetic and difficult to control, resulting in a wide variety of degradation products and undesirable carbonaceous decomposition products. Reductive defluorination of difluoramino compounds has also been used to produce fluorimino compounds.

It is an object of this invention to provide a process for photolytic decomposition of certain bis-difluoramino compounds to produce fluorimino compounds.

The process of the invention provides for the production of fluorimino compounds of the formula

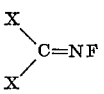

by subjecting a bis-difluoroamino compound having the formula

to the action of ultraviolet light. In the formulae, X and Y are chlorine or fluorine. The reaction can be illustrated as follows:

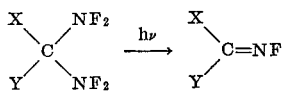

Generally speaking, the reaction takes place at temperatures between $-100°$ to $+100°$ C. Preferably the reaction is started at lower temperatures, e.g. $-78°$ C., and permitted to warm to room temperature or above.

The ultraviolet source used in the process can be any source producing light of wavelength less than about 4000 A. A mercury vapor arc lamp producing strong emission in the ultraviolet is useful.

The course of the reaction can be followed by infrared or nuclear magnetic resonance analyses. These can be made on samples which are returned to the reactor if desired. The reaction period varies with the temperature and intensity of the light, but generally periods of reaction varying from a few hours to several days are used.

Typical reaction conditions for the photolytic decomposition are as follows. The reaction is conveniently performed in a borosilicate glass bulb which has been coated on the inside with a thin layer of fluorocarbon grease (such as "Kel-F" grease). This coating (which minimizes undesirable side-reactions with the glass) is conveniently applied by rinsing the bulb with an acetone solution of the grease, followed by evaporation of the acetone. The bulb is cooled to liquid nitrogen temperature to allow vacuum transfer of the reactants, followed by evacuation to remove non-condensible gases. The bulb is then irradiated with an ultraviolet source such as a 100-watt mercury arc lamp (Hanovia) placed approximately 3 inches from the reactor. The reaction is allowed to continue up to 24 hours at temperatures ranging from $-78°$ to $100°$ C.

Improved yields of the fluorimines are obtained when the reaction is performed in the presence of a free radical scavenger such as nitrous oxide, which limits the attack of free radicals (formed by action of ultraviolet light on the reaction mixture) on the desired product. Suitable concentrations of the scavenger are in the range of 0.5 to 5 moles per mole of reactant.

Purification of the product is conveniently accomplished by preparative gas chromatography, using as the stationary phase 33 percent by weight of a fluorocarbon oil ("Kel-F" Oil 8126) on 30/60 mesh acid-washed diatomaceous earth-type filter aid.

The bis-difluoroamino compounds used as a starting materials are prepared by direct fluorination of nitrogen compounds. For example, bis(difluoramino) difluoromethane, $(F_2N)_2CF_2$, is obtained by the direct fluorination of ammeline (as described in the copending application for United States Letters Patent of Robert J. Koshar et al., Ser. No. 99,632). The chlorinated bis-difluoramino compounds such as $(F_2N)_2CFCl$ and $(F_2N)_2CCl_2$ may be prepared by the methods outlined in the copending applications for United States Letters Patent, Ser. No. 404,200, now U.S. Patent No. 3,358,028, D. H. Dybvig; and Ser. No. 404,201, now U.S. Patent No. 3,355,492, R. L. Rebertus et al.

Because many of the compounds used in this work are potentially hazardous because of their high content of fluorine bound to nitrogen, a suitable barricade and safety equipment such as heavy gauntlets and face shield should be used in carrying out the process.

The following examples, in which all parts are by weight unless otherwise specified, are given for illustrative purposes and are not intended to limit the scope of the claims hereof.

Example 1

A 500-ml. fluorocarbon grease-coated quartz bulb is charged at $-96°$ C. with 400 mg. of perfluorodiaminomethane and 300 mg. of nitrous oxide. The reactor is permitted to warm to room temperature and is then irradiated for about 10 hours with a 100-watt mercury arc lamp (Hanovia) at a distance of 3 inches, at room temperature. Chromatographic separation yields 12 mg. of perfluoromethylenimine. Based on recovered perfluorodiaminomethane this represents a 46 percent yield. Longer irradiation periods increase the amount of conversion.

Example 2

When bis(difluoroamino)chlorofluoromethane is employed as a starting material in the process of Example 1, C-chlorodifluoromethylenimine is obtained.

What is claimed is:
1. Process for the production of compounds of the formula

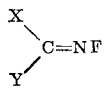

wherein X and Y are chlorine or fluorine, which comprises the step of subjecting a compound of the formula

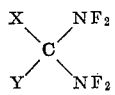

wherein X and Y have the same significance as hereinabove, to the action of ultraviolet light, at a temperature in the range of −78° to 100° C.

2. A process according to claim 1, in which the starting compound is perfluorodiaminomethane.
3. A process according to claim 1, in which the starting compound is bis(difluoramino)chlorofluoromethane.
4. A process according to claim 1, in which a scavenger for free radicals is present.
5. A process according to claim 4, in which nitrous oxide is employed as the free radical scavenger.

References Cited

Dybvig: "American Chemical Society," Abstracts of Papers, 148th meeting, 1964, page 9k.

HOWARD S. WILLIAMS, *Primary Examiner.*